United States Patent
Moon et al.

(10) Patent No.: US 12,475,285 B1
(45) Date of Patent: Nov. 18, 2025

(54) SOLVING MULTIPLE ARRAY PROBLEMS INTERACTING WITH EACH OTHER IN CONSTRAINT SOLVING FOR FUNCTIONAL VERIFICATION OF LOGIC DESIGNS

(71) Applicant: Synopsys, Inc., Mountain View, CA (US)

(72) Inventors: In-Ho Moon, Portland, OR (US); Qiang Qiang, Santa Clara, CA (US)

(73) Assignee: Synopsys, Inc., Sunnyvale, CA (US)

( * ) Notice: Subject to any disclaimer, the term of this patent is extended or adjusted under 35 U.S.C. 154(b) by 572 days.

(21) Appl. No.: 17/988,317

(22) Filed: Nov. 16, 2022

Related U.S. Application Data

(60) Provisional application No. 63/280,558, filed on Nov. 17, 2021.

(51) Int. Cl.
*G06F 30/33* (2020.01)
*G06F 30/3323* (2020.01)

(52) U.S. Cl.
CPC ................... *G06F 30/33* (2020.01)

(58) Field of Classification Search
CPC .... G06F 30/33; G06F 30/3323; G06F 30/367; G06F 30/327
See application file for complete search history.

(56) References Cited

U.S. PATENT DOCUMENTS

| | | | |
|---|---|---|---|
| 7,512,912 B1 * | 3/2009 | Iyer | G01R 31/318371 716/136 |
| 10,762,262 B1 | 9/2020 | Moon et al. | |
| 10,970,444 B1 * | 4/2021 | Bingham | G06F 30/33 |

* cited by examiner

*Primary Examiner* — Nghia M Doan
(74) *Attorney, Agent, or Firm* — Fenwick & West LLP

(57) ABSTRACT

In some aspects, a logic design undergoes functional verification, which includes generating a test stimulus to apply to the logic design. The test stimulus includes test values for variables representing signals in the logic design. Generating the test stimulus involves a first problem of solving for the test values of the variables subject to constraints on the test values. It is solved as follows. A specification of the logic design is accessed. An array implication graph is generated from the specification. The array implication graph represents the problem as a set of two or more single-array constraint problems. Each single-array constraint problem solves for the test values of a single array of the variables subject to the constraints within that single array. The array implication graph also represents dependencies between different single-array constraint problems. The problem is solved based on the dependencies represented in the array implication graph.

20 Claims, 15 Drawing Sheets

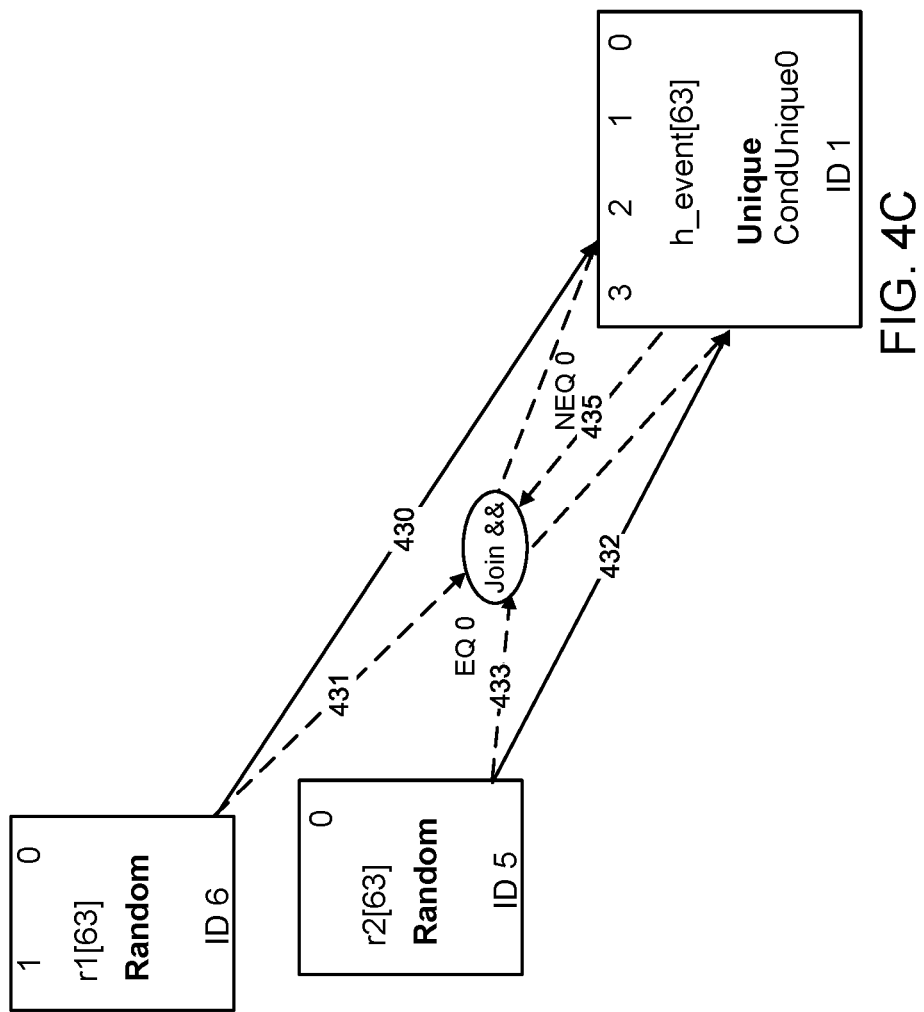

SOLVING MULTIPLE ARRAY PROBLEMS INTERACTING WITH EACH OTHER IN CONSTRAINT SOLVING FOR FUNCTIONAL VERIFICATION OF LOGIC DESIGNS

CROSS REFERENCE TO RELATED APPLICATIONS

This application claims priority under 35 U.S.C. § 119(e) to U.S. Provisional Patent Application Ser. No. 63/280,558, "Solving Multiple Array Problems Interacting With Each Other in Constraint Solving," filed Nov. 17, 2021. The subject matter of all of the foregoing is incorporated herein by reference in its entirety.

TECHNICAL FIELD

The present disclosure relates to functional verification of logic designs and more generally to solving array problems that interact with each other in constraint solving.

BACKGROUND

An electronic design automation (EDA) system provides design and testing of a logic design, for example for integrated circuits, modules and/or larger systems. Since these devices (e.g., system-on-chip (SOC) device) may have a large number of logic elements, generating such a design manually would be virtually impossible. The design process for these designs often includes simulation-type functional verification, where operation of a logic design is simulated to verify whether the logic design functions as intended. Such functional verification includes generating test stimuli to apply to the logic design and then observing the resulting operation. However, the test stimulus includes many different signals and the values of those signals are not independent of each other. The values of some signals will constrain the values of other signals. Test stimuli that are not compliant with these constraints do not represent signal values that would occur during normal operation and are therefore less useful.

SUMMARY

In some aspects, a logic design undergoes functional verification, which includes generating a test stimulus to apply to the logic design. The test stimulus includes test values for variables representing signals in the logic design. Generating the test stimulus involves a first problem of solving for the test values of the variables subject to constraints on the test values. It is solved as follows. A specification of the logic design is accessed. An array implication graph is generated from the specification. The array implication graph represents the problem as a set of two or more single-array constraint problems. Each single-array constraint problem solves for the test values of a single array of the variables subject to the constraints within that single array. The array implication graph also represents dependencies between different single-array constraint problems. The problem is solved based on the dependencies represented in the array implication graph.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 4 and 4A-4C illustrate another example array implication graph according to embodiments of the disclosure.

DETAILED DESCRIPTION

Figure 1:
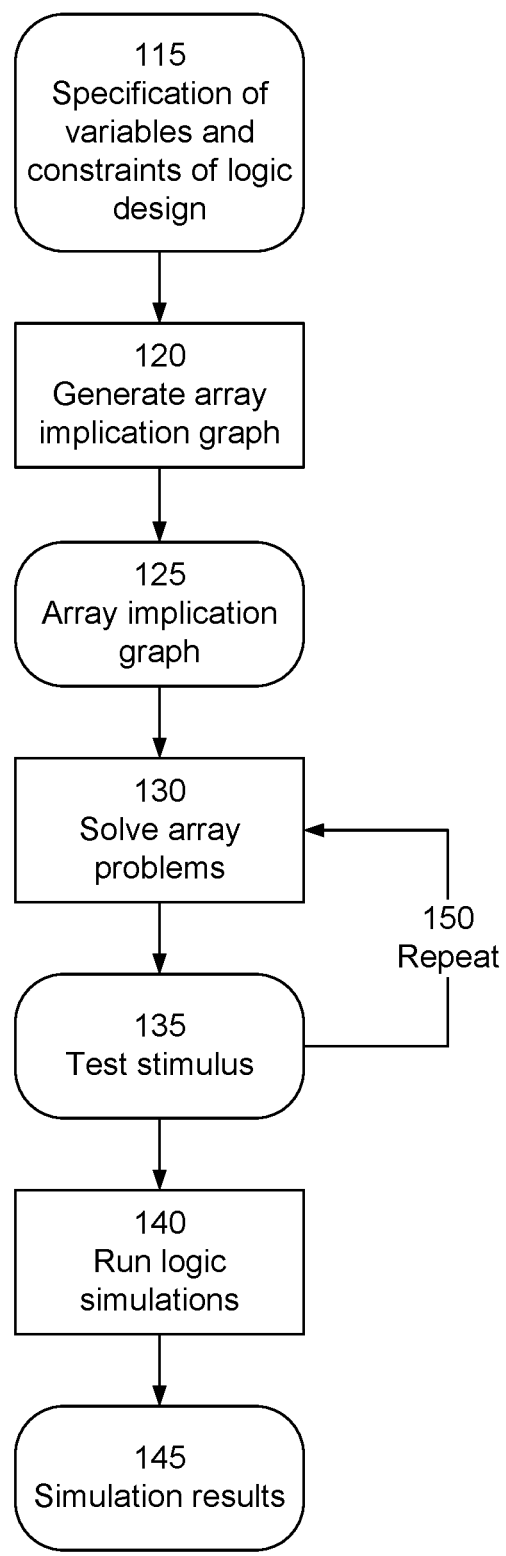
FIG. 1 is a flow diagram for generating a test stimulus for verifying a logic design according to embodiments of the disclosure.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Aspects of the present disclosure relate to solving multiple array problems interacting with each other in constraint solving for functional verification of logic designs. One task in simulating and verifying logic designs is to generate test stimulus to apply to the logic design. The test stimulus or test vector is a set of values for variables that represent signals in the logic design. However, these signals are not independent of each other. There are constraints on the values of the signals, and sometimes values of some signals determine the values or the constraints of other signals. Therefore, test vectors should be generated subject to these constraints. This is referred to as constraint solving or solving a constraint problem.

In some cases, it is advantageous to group variables into arrays. A single-array constraint problem is a problem to solve for test values of the variables in an array, subject to constraints on the test values. Examples of different types of single-array problems include the N-Queens problem, summation problems on multi-dimensional arrays on both rows and columns, cardinality problems, difference logic problems, counting number of occurrences of a value in an array (e.g., count-ones), ordering, uniqueness, and combinations of these. These problems are already difficult to solve for backtrack-based decision procedures, such as satisfiability (SAT), automatic test pattern generation (ATPG) and satisfiability modulo theories (SMT). As a result, specialized solvers have been developed, for example using relaxations and min conflicting techniques.

A multi-array constraint problem (or multi-array problem) is a problem that includes a set of two or more single-array constraint problems that interact with each other. A first single-array problem may imply to a second single-array problem, meaning that the solution of the second single-array problem depends on the solution of the first single-array problem. For example, the values of the variables in the first array problem may determine the values of the variables in the second array problem or may determine the constraints for the second array problem. However, when different array problems interact each other, the entire problem becomes much more difficult to solve, even with the use of specialized solvers. The multi-array problem also cannot be separated into single-array problems that are solved independently of each other, as this ignores the interactions between the array problems. Such an approach may get stuck as a result of local conflicts between different array problems.

This disclosure describes an approach to solve multi-array problems by capturing the interactions between the single-array problems in an array implication graph, and then solving the multi-array problem using this array implication graph. For example, artificial intelligence recognition techniques may be applied to the specification of the multi-array problem to recognize different types of single-array constraint problems.

The array implication graph may then be used to solve the multi-array problem by guiding the solution of the individual single-array problems. For example, the array implication graph may be used to determine an order for solving the single-array problems based on the directions of the implications in the graph. If the single-array problem X implies problem Y (i.e., a solution of problem Y depends on a solution of problem X) and problem Y implies problem Z, then X may be solved first and then Y and then Z. The array implication graph may also be used to further constrain the solution of individual single-array problems. For example, when solving Y, if X has already been solved, then the implication of the solution of X may impose further constraints on the solution of Y.

Technical advantages of the present disclosure may include, but are not limited to, the following. Dividing a multi-array problem into multiple single-array problems is advantageous, because the single-array problems are more likely to be solvable whereas it may not be practical to solve the multi-array problem. Single-array problems also require less memory and processing power to solve and also less time to solve. These advantages may be further enhanced if the solution of one single-array problem further limits the possible solution space of another single-array problem.

Furthermore, representing the problem as an array problem with constraints on and interactions between arrays, rather than as a problem with constraints on individual variables, is also advantageous. This raises the level of representations from the individual element (variable) level to the array-level. Most systems are inefficient at solving multi-array problems if the constraints and implications are constructed at the individual variable level, since the number of combinations of individual variables can be extremely large, thereby making the constraint solving problem computationally intensive. However, when the level of representation is raised to the array-level, this higher level of representation reduces the complexity of the problem significantly in both time and computer memory. Accordingly, multi-array problems involving large array sizes may be solved more efficiently compared to other techniques.

FIG. 1 is a flow diagram for generating a test stimulus for verifying a logic design. The test stimulus is a set of test values for variables representing signals in the logic design. However, the test values are subject to certain constraints. The variables can be organized into arrays, and some of the constraints are between different arrays. In this way, the problem may be described as a multi-array problem. The solution of this multi-array problem is a test stimulus that can be used in logic simulation to assist the designer in developing their logic design. However, the techniques described herein for solving multi-array problems may also be used for other applications that may be formulated as a multi-array constraint problem.

In FIG. 1, a specification 115 describes the logic design being verified, including constraints on the variables. The specification 115 may be in a hardware description language (HDL), such as Verilog or VHDL. The problem of generating a test stimulus may be formulated as a multi-array constraint problem, using the variables and constraints in the specification. A multi-array constraint problem includes a set of two or more single-array constraint problems, where each single-array constraint problem is a problem to solve for values of variables in an array subject to constraints on those values. The single-array constraint problems interact with each other. The variables, constraints and interactions are described in the specification 115.

Listing 1 below is an example of a specification of a multi-array problem written in a hardware description language (HDL) such as SystemVerilog. This listing may be part of the HDL description of a logic design.

---

Listing 1: An example multi-array problem

```
class c1;
  rand bit [7:0] values[5];
  rand bit [7:0] count[5];
  rand bit [7:0] appear[20];
  rand bit valid[20];
  constraint cons {
    foreach (values[j]) {
      if (j > 0) values[j] > values[j-1]; // increasing order
    }
    count.sum( ) == 10;
    foreach (count[i]) {
      count[i] inside {[0:3]};
      if (count[i] == 0) (appear.sum( ) with (int'(item == values[i]))) == 2;
      if (count[i] == 1) (appear.sum( ) with (int'(item == values[i]))) == 3;
      if (count[i] == 2) (appear.sum( ) with (int'(item == values[i]))) == 1;
      if (count[i] == 3) (appear.sum( ) with (int'(item == values[i]))) == 1;
    }
    foreach (appear[j]) {
      if (appear[j] inside values)
        valid[j] == 1; // appear[j] exists in values
      else
        valid[j] == 0;
    }
  }
endclass
```

---

In this example, there are four arrays with corresponding single-array problems. The 'values' array problem is an ordering problem that requires elements of the array to be in increasing order, and the 'count' array problem is a summation problem that requires the sum of elements in the array to be 10. The 'appear' array problem is a cardinality problem, and the 'valid' array problem is an inside problem. In the 'appear' array problem, depending on the value of count[i], the value of values [i] should appear as one of {1, 2, 3} times in the array 'appear.' In the 'valid' array problem, if the value of appear [j] exists inside the array 'values' (which is the inside problem), valid [j] is set to 1.

The array 'appear' is implied by the arrays 'values' and 'count', and the array 'valid' is implied by the arrays 'appear' and 'values'. Even though the arrays 'values' and 'count' can be solved independently, the arrays 'appear' and 'valid' cannot be solved independently since those arrays are implied by (depend on) other arrays.

The following is one solution satisfying all the constraints of the multi-array problem:
values: [2 3 6 8 10]
count: [1 1 3 2 3]
appear: [218 2 2 229 2 159 3 3 3 162 232 196 6 8 235 66 10 34 176 93]
valid: [0 1 1 0 1 0 1 1 1 0 0 0 1 1 0 0 1 0 0 0]

When the problem size is relatively small in terms of the array sizes, it can be solved by a backtrack-based solver. However, when the problem size becomes relatively larger, the problem becomes infeasible to solve using such backtrack-based solvers. The problem becomes too difficult due to too many backtracks in the decision procedure.

However, this multi-array problem may be solved using the flow shown in FIG. 1. At 120, an array implication graph 125 is generated from the specification 115. The array implication graph represents the problem described in the specification as a set of two or more single-array constraint problems. Each single-array constraint problem identifies the array of variables to be solved for and the constraints that apply to that array. The array implication graph 125 also captures the implications (interactions) between the single-array constraint problems in the set.

At 130, the multi-array problem is solved based on the array implication graph 125. In this process, the array implication graph 125 is created at the array-level and captures the implications (dependencies) between single-array constraint problems in the set. It represents not only what each single-array problem is, but also how the array problems are interacting with each other, by capturing the intents of the given constraints to solve. The array implication graph is self-contained since it includes all the information necessary to solve the overall multi-array problem. The array implication graph may be constructed through problem and implication recognitions from the testbench specification written in a hardware description language such as SystemVerilog.

Once the array implication graph at the array-level is constructed, the multi-array problem may be solved quickly and efficiently by solving the individual single-array problems using a look-around technique, possibly with both look-back and look-ahead, as explained in more detail below. The resulting solution 135, which is a test stimulus in this application, may be used to progress the logic design.

In FIG. 1, the test stimulus 135 is applied to the logic design for logic simulation of the designat 140. The logic simulation produces a result 145, such as a verification of whether the logic is operating as desired. The loop 150 in FIG. 1 indicates that different solutions may yield different test stimuli, for example if randomized simulation is performed. However, these stimuli will not be completely random, since they all meet the constraints in specification 115.

Figure 2:
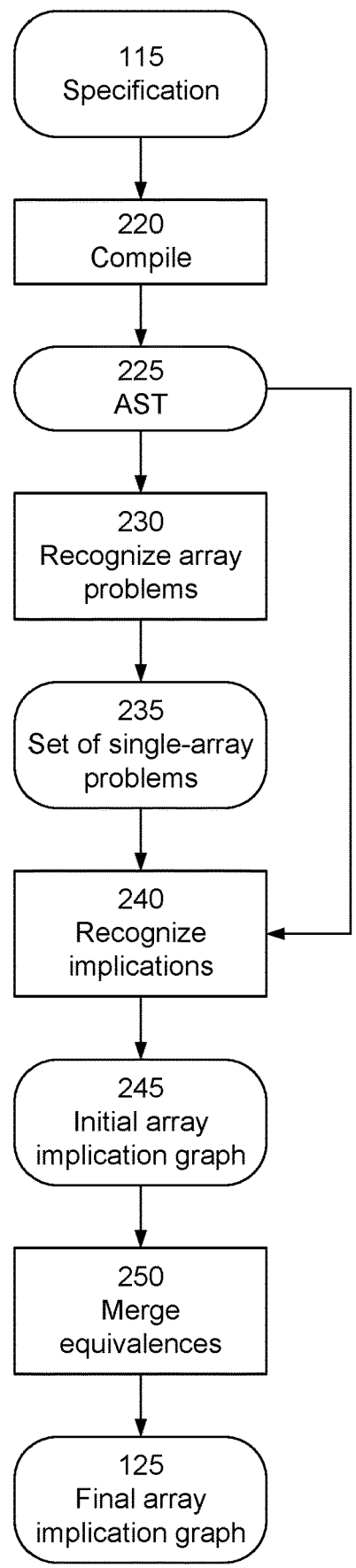
FIG. 2 is a flow diagram for generating an array implication graph according to embodiments of the disclosure.

FIG. 2 shows an example implementation of step 120 in FIG. 1. At 220, the specification including constraints 115 is compiled to produce an abstract syntax tree (AST) 225. The AST is an intermediate representation of the set of constraints in the specification 115 at the word-level. The actual structure may be a set of expressions or other data structure capable of representing the multi-array problem. The hierarchy used in this disclosure is from highest to lowest: array-level, word-level and bit-level. Words (individual variables) may be grouped into arrays, or decomposed into individual bits. Word-level constraint solvers work on the AST directly to find a solution. For bit-level constraint solvers, a bit-level representation is generated from the word-level representation by bit blasting the word-level representation, and the bit-level constraint solver then works on the bit-level representation.

At 230, the AST is taken as input and analyzed to recognize one or more types of single-array constraint problems (e.g., N-Queens problem, summation problems on multi-dimensional arrays on both rows and columns, cardinality problems, difference logic problems, counting number of occurrences of a value in an array (e.g., count-ones), ordering, uniqueness, and combinations of these). The result is a set of recognized single-array problems 235. At 240, the AST is further analyzed to recognize implications (dependencies) between the recognized problems 235. This produces an initial array implication graph 245, which includes both a description of the single-array problems and implications between the array problems. At 250, equivalences are identified and equivalent problems are merged. The result is the final array implication graph 125. When there are no equivalence relations on the array problems, the initial array implication graph 245 become the final array implication graph 125.

Since this overall flow relies on problem recognition, when there are array problems and implications left as unrecognized, the flow may handle these by using conventional constraint solvers. The recognized array problems are solved by the techniques described herein and the unrecognized problems are solved by conventional constraint solvers.

At steps 230 and 240, the recognized array problems and recognized implications are used to generate the array implication graph, which is at the array-level. Since an array is a group of word-level variables, the array implication graph captures implications among different groups of word-level variables where each group is for an array. This makes the array implication graph array-level.

The array implication graph identifies not only the type of each individual single-array problem, such as N-Queens problem, summations on MDAs, and so on, but also identifies the interactions between the different single-array problems and how array problems imply to other array problems. Furthermore, the array implication graph may be self-contained for the overall multi-array problem. It does not require the AST 225 because the information from the AST required to solve the single-array problems is captured from the problem recognition 230.

As an example, suppose that one of the single-array problems is an N-Queens problem (size of 1000 Queens) which is described in two-dimensional array form as follows.
(1) Sum of each row is 1
(2) Sum of each column is 1
(3) Sum of each diagonal is 1 or 0

Conventional solvers (including SMT) do not know that this is an N-Queens problem. The solvers just try to find a solution satisfying all three of these constraints. In practice, there may be many more constraints in the number of rows, columns, and diagonals. In contrast, the system described herein recognizes the problem as an N-Queens problem of size 1000, and then solves the 1000 Queens problem directly without analyzing the constraints. This is because once the N-Queens problem is solved, the solution is already supposed to satisfy all those constraints.

Furthermore, since the system recognizes that this is an N-Queens problem and what the size N is, the system can solve this N-Queens problem as a one-dimensional array of word variables, which is easier to solve and is known as the compact form of N-Queens problem as opposed to the binary form of N-Queens problem. The compact form of N-Queens problem is as below.

(1) Each element should have a value in the range of [0:N−1]
(2) All elements should be unique
(3) For all index i and j in the array X, |(X[i]−X[j])|!=|(i−j)|

Once a solution is found from this compact form, the solution can be mapped from the one-dimensional array to the original two-dimensional array.

This is possible because the system identifies the array problems in the input set of constraints and solves the problem directly on the array implication graph at the array-level, rather than trying to solve the constraints of the problem in the AST. The problem recognition 230 not only generates the array implication graph at the array-level, but also captures the intent of the constraints. Since there is no constraint language construct to describe an N-Queens problem directly in a hardware description language such as SystemVerilog, users may specify a set of constraints in either the compact form or the binary form. In the system disclosed, the problem recognition captures the intent of the constraints from the given set of constraints, and solves the N-Queens problem directly, as if the constraint language construct is available for N-Queens problem. This is "high level constraint solving" in the system disclosed since it captures the intents of the constraints and solves on the intents directly, rather than on the given set of constraints.

Each of steps 230, 240, 250 is illustrated below using an example. Listing 2 below shows an example illustrating array problem recognition 230.

Listing 2: Example illustrating array problem recognition

```
rand bit [7:0] X[10][10];
foreach (X[i]) {
    X.sum with (item.index(1) == i ? int'(item): 0) == 990; // sum of rows
}
foreach (X[j]) {
    X.sum with (item.index(2) == j ? int'(item): 0) == 990; // sum of columns
}
```

Here, X is a 2-dimensional array and the first constraint says that the sum of each row should be 990 and the second constraint says that the sum of each column should be also 990. In this case, without knowing that there are both row summation and column summation together, this problem is difficult to solve. The conventional constraint solvers have difficulty to solve this problem especially when the array size becomes much larger because each summation problem is solved independently even though there is a tight relation between row summations and column summations. Thus, in the array problem recognition, it is recognized that the array problem of X is a combination of row summations and column summations and this problem can be solved by the specialized solver for array problems.

When there are both row summations and column summations, both should be satisfied at the same time. The system may initially recognize one of the two summations, for example the row summations. Then, the problem type is set to Summation, and the summation type is set to Row. The system further recognizes the column summations, since the problem type is already set to summation, and the summation type is change to RowAndCol since both row and column summations have to be satisfied.

Artificial intelligence, such as rule-based pattern matching, may be used at 230 to recognize different types of array problems. The type of array problem is determined by the category of constraints that apply to the array. When parsing constraints, those constraints containing array variables may be identified and then categorized based on characteristics of the constraints. These characteristics may include numbers of operators, such as plus, minus, multiply, divide, imply, eq, neq, ineq, logical relation operators (AND, OR, XOR, XNOR), and bitwise operators (AND, OR, XOR, XNOR). They may also include the number of array variables, number of non-array variables, number of constants, number of array IDs, and so on. By considering the characteristics of the constraints, the type of array problem may be determined. For example, suppose X is a two-dimensional 10×10 array. One of the constraint categories is summation. If the specification includes a constraint such as X[0][0]+X[0][1]+ . . . +X[0][9]==100, it may be determined that X is a summation problem. Row[0] is marked as having a summation. Then, after all ten rows are marked as summation, it may be determined that array X is a summation problem on rows.

Listing 3 below shows an example illustrating implication recognition 240.

Listing 3: Example illustrating implication recognition

```
rand bit X[64];
rand bit [7:0] Y[64];
X.sum( ) with (int'(item)) == 48;
Y.sum( ) with (int'(item)) inside {[1000:2000]};
foreach (X[i]) { // implications
```

-continued

Listing 3: Example illustrating implication recognition

```
    X[i] == 0 -> Y[i] == 0;
    X[i] == 1 -> Y[i] > 0;
}
```

Here, both arrays X and Y are summation constraints on one-dimensional arrays and these are recognized from the array problem recognition. However, these two summation constraints cannot be solved independently because the two arrays are interacting with each other though the implications between X and Y. If X[i] is 0, the corresponding Y[i] must be also 0. If X[i] is 1, the corresponding Y[i] must have a non-zero value. Thus, implication recognition captures these implication relations and puts them into the array implication graph.

Artificial intelligence, such as rule-based pattern matching, may also be used at 240 to recognize implications. For example, implications may arise from implied constraints that use the imply operator→. An example is "condition1→constraint1", which means that condition 1 implies constraint 1. This is an array-level implication when array variables appear on both the lefthand side and righthand side of the implied constraint. An expression such as "if (condition1)constraint1" may be compiled as "condition1→constraint1".

Furthermore, the implication recognition may also capture the effect of the constraints, according to the array problem recognition and implication recognition. In this case, the array X is supposed to have 48 elements with value 1. This implies that the array Y should have 48 non-zero elements and 16 zero elements, which is the net effect of these implications. Thus, even if the implication direction is from X to Y, it is even possible to solve the array problem Y first since the system determines the effect of the whole constraints.

Listing 4 below shows an example illustrating merging equivalences 250. When there is an equivalence relation between two array problems, the array problems are merged to avoid local conflicts if the system solves the two array problems separately as is.

---

Listing 4: Example illustrating merging equivalent array problems

```
rand bit [31:0] X[100];
rand bit [31:0] Y[100];
X.sum( ) with (int'(item)) < 1000;
foreach(X[i]) {
    X[i] inside {[0:100]}; // element of range X
    X[i] == Y[i]; // equivalence relation between X and Y
}
foreach (Y[i]) {
    Y[i] inside {[0:50]}; // element of range Y
    i > 0 -> Y[i] >= Y[i-1]; // non-decreasing order
}
```

---

There are two array problems, X and Y. The array problem X is a summation problem on a 1-dimensional array with its element range as [0:100]. The array problem Y is an ordering problem with its element range as [0:50]. The summation of X should be less than 1000 and the ordering of the elements in Y should be non-decreasing.

Furthermore, there is an equivalence relation between X and Y, which means that the two array problems X and Y should satisfy the summation constraint, the ordering constraint, and the element constraints all together. If the system solves one of the two array problems as is first, then when the system solves the other problem, the probability of getting a local conflict is high. Thus, the system merges the two array problems and makes the two problems the same such that the problem type is a summation with ordering, the summation should be less than 1000, the ordering should be non-decreasing, and the valid range of each element should be [0:50] which is the intersection between [0:100] and [0:50].

Once the two array problems on equivalence problems are merged, the system can solve any one of the two problems and the solution from one array problem can be simply copied to the other array problem.

Figure 3:
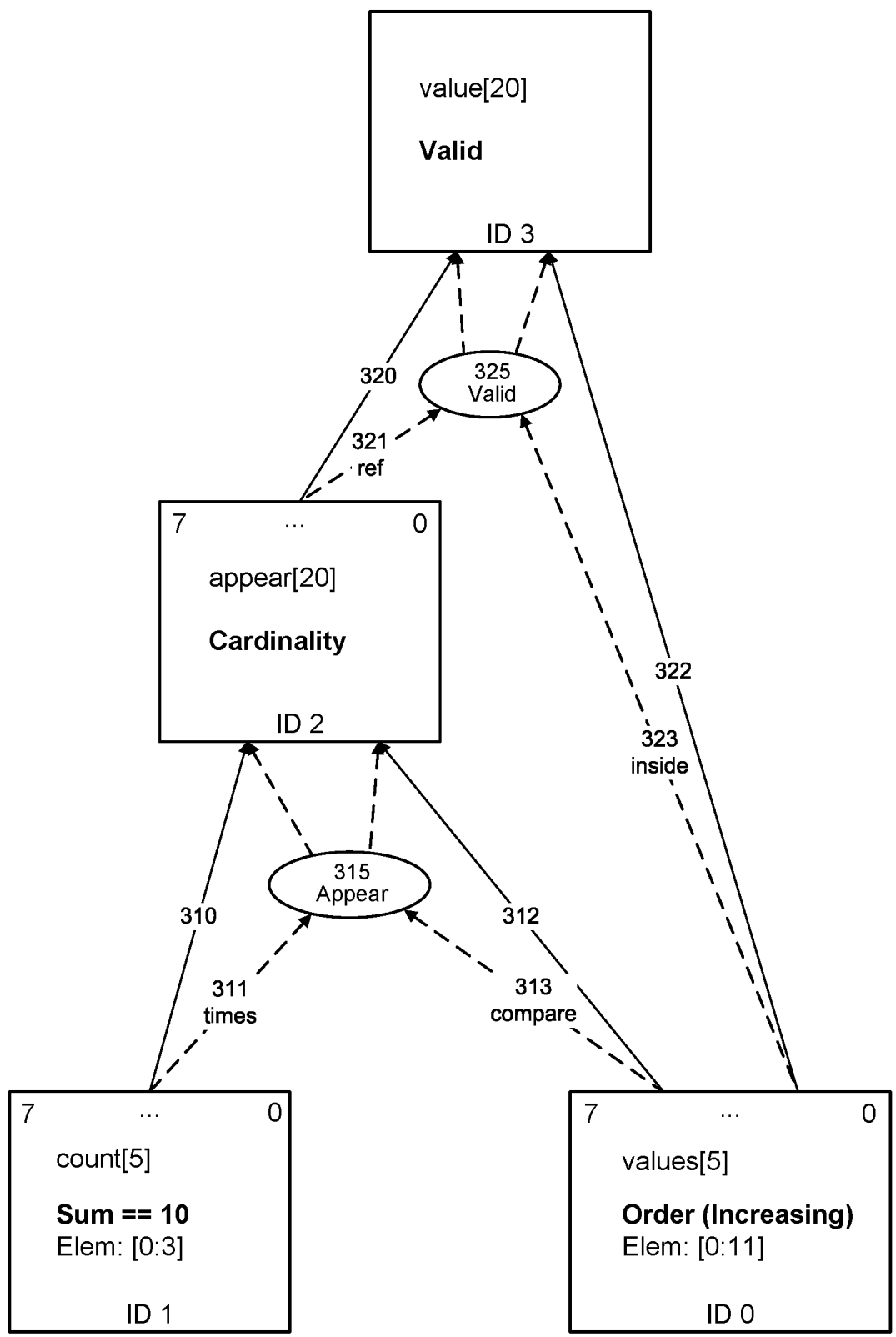
FIG. 3 illustrates an example array implication graph according to embodiments of the disclosure.

FIG. 3 illustrates an example array implication graph. This array implication graph represents the multi-array problem of Listing 1 above. The array implication graph includes nodes represented by rectangles in FIG. 3, and edges represented by arrows between the nodes. The nodes may be referred to as ArrayProblems. Each node represents a single-array problem with its array dimension and sizes, problem types, variable precision and element ranges, and a unique identifier (ID).

For example, the Array Problem ID 0 is the single-array problem for the array 'values', which has 5 elements with bits 0 . . . 7. This single-array problem is type Order (Increasing), which means that the elements in the array must be in increasing order. Similarly, Array Problem ID 1 is the single-array problem for the array 'count', which has 5 elements with bits 0 . . . 7. This single-array problem is type Sum, where the sum is 10. Array Problem ID 2 is the single-array problem of type Cardinality for the array 'appear', which has 20 elements with bits 0 . . . 7. ArrayProblem ID 3 is the single-array problem of type Valid for the array 'value', which has 20 elements with one bit.

Solid arrows between rectangles represent dependencies between the Array Problems. These solid arrows are referred to as Imply edges and they represent how one array problem implies to the other array problem. In most cases, the arrow represents the direction of the implication. For example, "A[i]==1→B[i]>0" is a unidirectional constraint from array A to B. However, an Imply edge can be bidirectional if the implication is a Boolean relation such as "A[i]==0||B[i]==0" which means that at least one of the corresponding elements (i-th) of the array A and B must be assigned to 0.

In some cases, dependencies involve more than two array problems. In those cases, in addition to the solid Imply edges created among those ArrayProblems, the array implication graph also includes a Join operator represented by ovals in FIG. 3 and additional JoinImply edges represented by dashed lines in order to capture how the overall implications are made among those Array Problems.

For example, in FIG. 3, the 'count' ArrayProblem (ID 1) implies to the 'appear' Array Problem (ID 2) as indicated by Imply edge 310, and the 'values' ArrayProblem (ID 0) also implies to the 'appear' Array Problem (ID 2) as indicated by Imply edge 312. However, these two implications are not independent of each other. The Join operator 'Appear' 315 and the corresponding JoinImply edges of 'times' 311 and 'compare' 312 capture these interactions.

Similarly, the 'appear' ArrayProblem (ID 2) implies to the 'value' Array Problem (ID 3) as indicated by the Imply edge 320, and the 'values' ArrayProblem (ID 0) also implies to the 'value' Array Problem (ID 3) as indicated by Imply edge 322. However, these two dependencies are not independent. The relationships of the dependencies are captured by the Join operator 'Valid' 325 and the corresponding JoinImply edges of 'ref' 321 and 'inside' 323.

The Join operator represents a dependency on two or more single-array problems. A Join operator can be either a special type of operation, such as 'Appear' and 'Valid' in FIG. 3. It may also be a Boolean relation of incoming JoinImply edges. When a Join operator is a special type of an operation, its incoming JoinImply edge represents an operand type, such as 'times' and 'compare' for 'Appear', and 'ref' and 'inside' for 'Valid' in FIG. 3. These operand type names are used for distinguishing each operand from the others.

When a Join operator is a Boolean relation, a JoinImply edge is a Boolean term of the Boolean relation. For example, for a condition as "A[i]==0 && B[i]!=0", the Join operator is "&&" as Boolean AND, and one JoinImply coming from the array A is "EQ 0" as equal to 0, and the other JoinImply coming from the array B is "NEQ 0" as not equal to 0. Join operator can be also a nested form. For example, we can have a condition as "(A[i]==0 && B[i]!=0)||(A[i]!=0 && B[i]==0)", we can have three Join operators as one parent "||" operator as Boolean OR and two children "&&" operators as Boolean AND. Join operator and JoinImply will be explained further below.

The array 'appear' has the conditional cardinality map as shown in Table 1 below. This map shows how many times value[i] is supposed to appear in the array 'appear', depending on count[i]. For example, if count[1] is 1, value[1] should appear three times. This information is also captured in the array implication graph, although it is not expressly shown in FIG. 3.

TABLE 1

Conditional cardinality in FIG. 3

| count[i] | Conditional cardinality of value[i] |
|---|---|
| 0 | 2 |
| 1 | 3 |
| 2 | 1 |
| 3 | 1 |

Listing 5 below illustrates an unconditional implication between arrays.

Listing 5: Simple implication between arrays

```
rand int src[10];
rand int dst[10];
foreach (src[i]) {
    src[i] == 1 -> dst[i] > 0;
}
```

When a variable of an array problem implies to another variable of another array problem, if the two arrays are single dimension and their array sizes are the same, since the variables are a one-to-one mapping between the two arrays, there is no need for any special mapping for the implication on the variables among the two arrays, as shown in Listing 5 above.

Listing 6 below illustrates a conditional implication requiring variable mapping.

Listing 6: Conditional implication between arrays

```
rand bit [1:0] r1[63];
rand bit [7:0] config1[7][63];
foreach (config1[i]) {
    foreach (r1[j]) {
        r1[j] == 0 -> config1[i][j] inside {[0:1]};
        r1[j] == 1 -> config1[i][j] inside {[0:4]};
        r1[j] == 2 -> config1[i][j] inside {[0:16]};
        r1[j] == 3 -> config1[i][j] inside {[0:64]};
    }
}
```

In Listing 5, each src[i] is mapped to dst[i]. However, there are cases where variable mapping information is required when there are multi-dimensional arrays or different array sizes in one Imply with multiple arrays. In Listing 6 above, the array 'r1' is a one-dimensional and the array 'config1' is two-dimensional. In this case, one variable r1[j] implies to config1[i][j] for all rows (for all i). Once r1[j] is assigned, all column variables of {config1[0][j], . . . , config1[6][j]} must have a value in the range of [0:16]. Thus, the variable mapping on this Imply from 'r1' to 'config1' is INDEX to INDEX. Here, INDEX is just an index for one-dimensional array, and a column for two-dimensional array. When the array sizes are different, an offset value may be used in the mapping to represent (INDEX+offset) to INDEX, or INDEX to (INDEX+offset). Also, the mapping has a 'reversed' flag when the variables are mapped in reversed order such as the lowest index in one array is mapped to the highest index in another array.

From the recognition of Listing 6, the system determines the following variable mapping in the implication as below
   Map: (lhs: INDEX, rhs: INDEX)

Here, lhs stands for left-hand side and rhs for right-hand side. The conditional implication may be recognized in the following form.
   VALUE (EQ): 0→RANGE: [0,1]
   VALUE (EQ): 1→RANGE: [0,4]
   VALUE (EQ): 2→RANGE: [0,16]
   VALUE (EQ): 3→RANGE: [0,64]

Here, VALUE means the value of the lhs array element, and RANGE means the value of the rhs array element should be in the range specified. EQ is one of relational operators from {EQ, NEQ, GT, LT, GEQ, LEQ}.

For simplicity without loss of generality, suppose there are up to two-dimensional arrays. Then, there may be three mapping components as {ROW, INDEX, BIT}.

Figure 4:
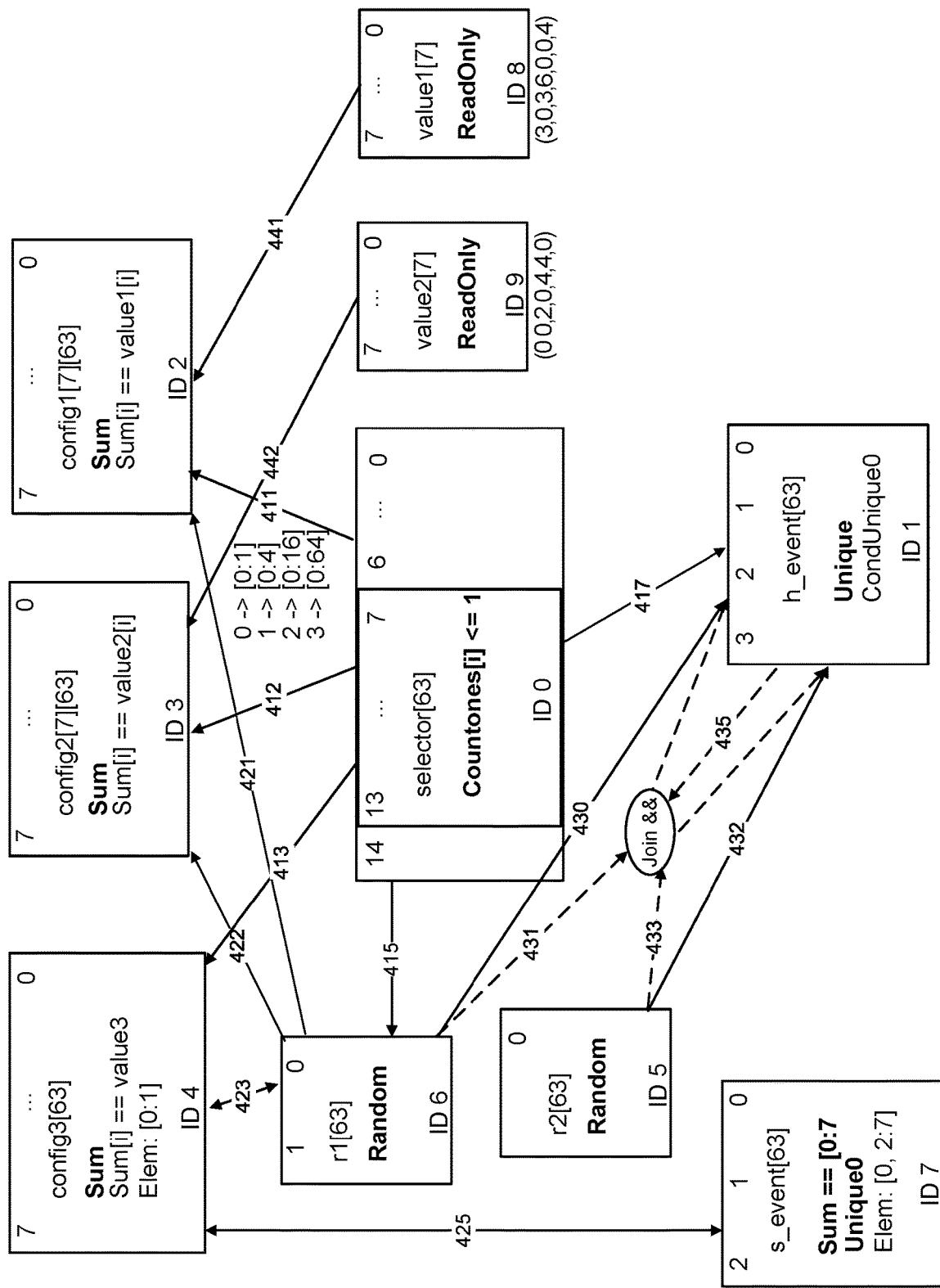
Figure 4A:
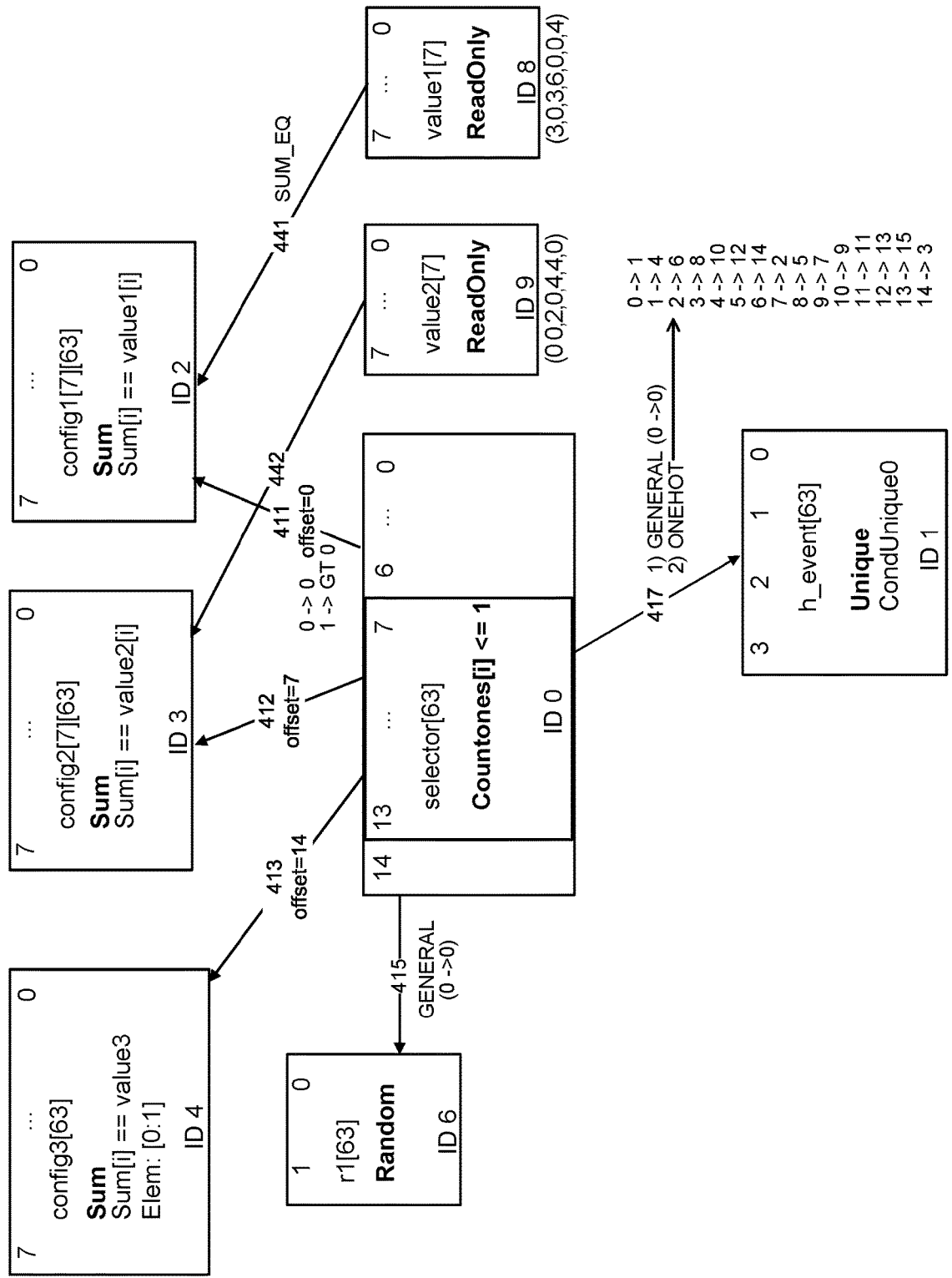
Figure 4B:
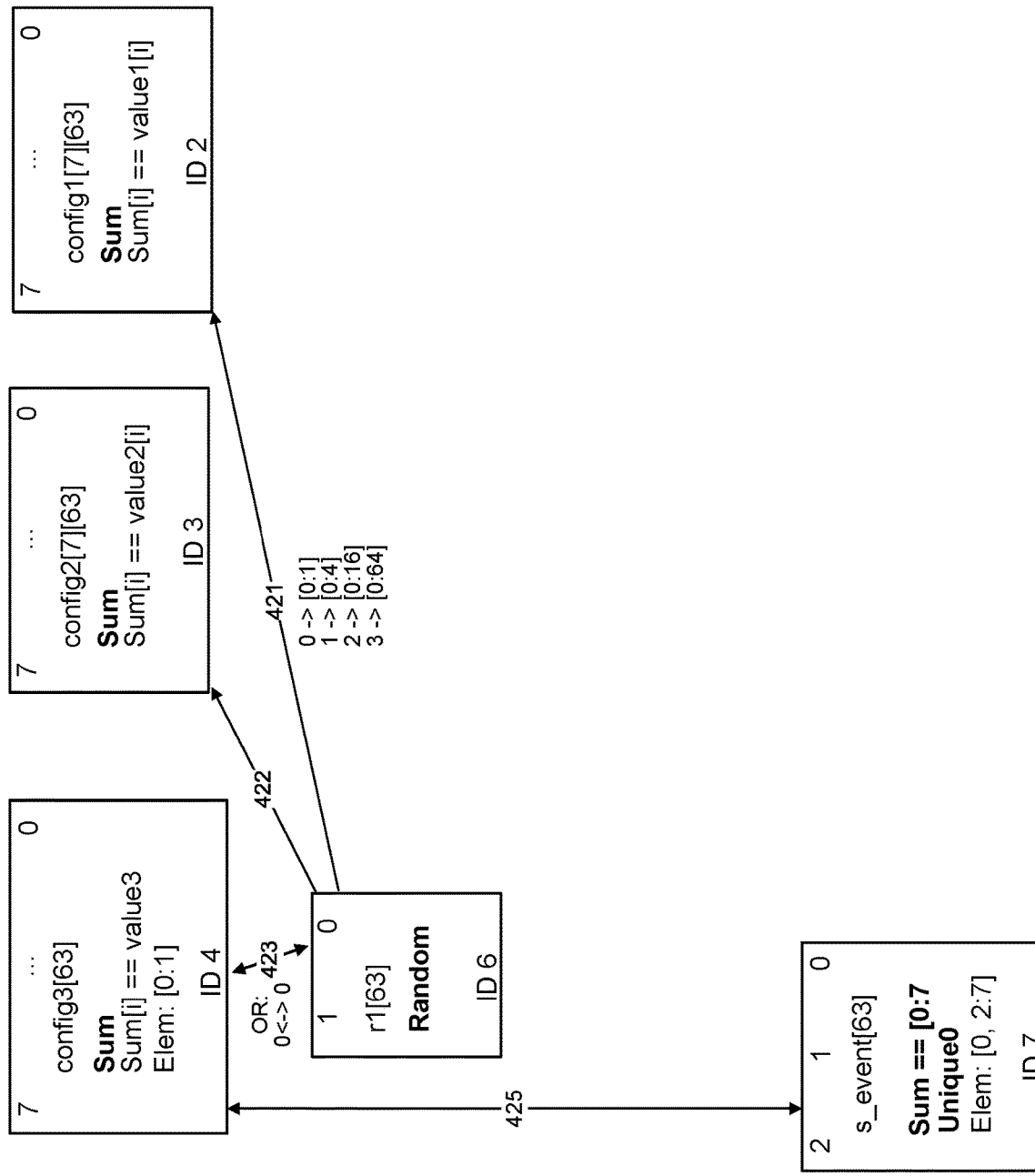

FIG. 4 shows an array implication graph for a multi-array problem with more conditional implications. This example shows how the variable mappings are done among the array problems. FIG. 4 shows all of the Array Problems ID 0-9 and all of the Imply edges (solid arrows). FIGS. 4A-4C show subsets of FIG. 4 for purposes of clarity in discussing specific cases.

In this example, as shown in FIG. 4A, the array 'selector' controls the whole problem and implies to arrays 'config1' (Imply edge 411), 'config2' (edge 412), 'config3' (edge 413), 'r1' (edge 415), and 'h_event' (edge 417). The low 7 bits (selector[i][6:0]) implies to 'config1', and the next 7 bits (selector[i][13:7]) implies to 'config2', and the highest bit (selector[i][14]) implies to 'config3'. The array problem type of 'selector' is Countones which is counting the number of bits of 1 in each selector[i]. Since Countones (selector[i])<=1, each selector[i] is either 0 or a power of 2 when only one single bit of selector[i] is 1.

The problem type of the array 'config1' is Summation and the sum of each config1[i] should be equal to value1[i] of the array 'value1' as indicated by Imply edge 441. Similarly, the sum of each config2[i] should be equal to value2[i] of the array 'value2' as indicated by Imply edge 442. The sum of the array 'config3' should be equal to a state variable 'value3' which is assigned to 0. The arrays 'value1' and 'value2' are read-only and the array values are used only when solving the corresponding arrays 'config1' and 'config2', respectively.

In FIG. 4, there are many implications among various array problems. Each implication of all Imply is explained separately as follows.

Case 1) Selector→config1 (Imply Edge 411 in FIG. 4A)

The implication from 'selector' to 'config1' was recognized from the following constraints.

```
foreach (config1[x,y]) {
    selector[x][y] == 0 -> config1[y][x] == 0;
    selector[x][y] == 1 -> config1[y][x] > 0;
}
```

In 'selector', the loop variable x is INDEX and y is BIT, whereas in 'config1', x is INDEX and y is ROW. Thus, the following two variable mappings are obtained from the recognition in the implication as below.

Map1: (lhs: BIT, rhs: ROW)–Partial: 7 bits
Map2: (lhs: INDEX, rhs: INDEX)

In Map1, "Partial: 7" is an attribute to represent when only partial bits (or elements) are used in the mapping, and in this case, only 7 bits (selector[x][6:0]) are used. Then, the following conditional implication is recognized.

VALUE (EQ): 0→VALUE (EQ): 0
VALUE (EQ): 1→VALUE (GT): 0

Case 2) Selector→config2 (Imply Edge 412 in FIG. 4A)

Similarly, the implication from 'selector' to 'config2' was recognized from the following constraints.

```
foreach (config2[x,y]) {
    selector[x][y + 7] == 0 -> config2[y][x] == 0;
    selector[x][y + 7] == 1 -> config2[y][x] > 0;
}
```

In this case, since there is an offset value 7, the system gets the same variable mappings in the implication as in Case 1), but with the offset as below.

Map1: (lhs: BIT+7, rhs: ROW)–Partial: 7 bits
Map2: (lhs: INDEX, rhs: INDEX)

The following conditional implication is recognized.

VALUE (EQ): 0→VALUE (EQ): 0
VALUE (EQ): 1→VALUE (GT): 0

Case 3) Selector→config3 (Imply Edge 413 in FIG. 4A)

The implication from 'selector' to 'config3' was recognized from the following constraints.

```
foreach (config3[x]){
    selector[x][14]==0→config3[x]==0;
    selector[x][14]==1→config3[x]>0;
}
```

In this case, since there is an offset value 14, the system determines the following two variable mappings in the implication.

Map1: (lhs: INDEX, rhs: INDEX)
Map2: (lhs: BIT+14, rhs: NONE)–Partial: 1 bit

In Map2, since the array 'config3' is a one-dimensional array, the rhs mapping is NONE which means that only the lhs is used to point to the bit 14, which is selector[x][14]. The following conditional implication is obtained.

VALUE (EQ): 0→VALUE (EQ): 0
VALUE (EQ): 1→VALUE (GT): 0

Case 4) Selector→r1 (Imply Edge 415 in FIG. 4A)

The problem type of the array 'r1' is Random which means that any random value can be assigned to each element, except the following implication. The implication from 'selector' to 'r1' was recognized from the following constraint.

```
foreach (r1[x]) {
    selector[x] == 0 -> r1[x] == 0;
}
```

Thus, r1[x] can be assigned to any value except when selector[x] is assigned to 0, in which case r1[x] should be also assigned to 0. In this case, the variable mapping in the implication is as below.

Map: (lhs: INDEX, rhs: INDEX)

In FIG. 4A, the implication type is shown as 'GENERAL (0→0)' which means that if the value of a lhs element is 0, the value of the corresponding rhs element should be 0. The general form of this GENERAL implication is GENERAL (v1→v2)
where v1 is a value of the lhs element and v2 is the implied value on the rhs element.

Case 5) r1→config1, config2 (Imply Edges 421, 422 in FIG. 4B)

The implications from the array 'r1' to the two arrays 'config1' and 'config2' were previously explained in Listing 6.

Case 6) r1→config3 (Imply Edge 423 in FIG. 4B)

When the implication between two arrays is a Boolean relation, the implication is bidirectional even though the Imply edge may be shown as a unidirectional arrow. The implication from the array 'r1' to the array 'config3' was recognized from the following constraint.

```
foreach (config3[x]) {
    r1[x] == 0 || config3[x] == 0;
}
```

In this case, the variable mapping in the implication is as below.

Map: (lhs: INDEX, rhs: INDEX)
The implication type is Boolean OR as below.
OR (0↔0)

Also, the general form of any Boolean relation is as follows.

BOOLEAN_OP (v1↔v2)
Here, BOOLEAN_OP is one of {AND, OR, XOR, XNOR}, and v1 is a value of the lhs variable and v2 is a value of the rhs variable.

Case 7) config3→s_event (Imply Edge 425 in FIG. 4B)

The problem type of s_event is both Summation and Unique0, and the Summation is supposed to be in the range of [0:7], and Unique0 means that all numbers in the elements should be unique, except those elements with value 0 which is allowed to be duplicated. Also, the valid value of each element is either 0 or in the range of [2:7].

The implication from the array 'config3' to the array 's_event' was recognized from the following constraint.

```
foreach (s_event[x]) {
    config3[x] == 0 || s_event[x] == 0;
}
```

In this case, the variable mapping in the implication is as below.

Map: (lhs: INDEX, rhs: INDEX)
The implication type is Boolean OR as below.
OR(0↔0)

Case 8) selector→h_event (Imply Edge 417 in FIG. 4A)

The problem type of h_event is Unique, but conditional Unique0. There are two implications from the array 'selector' to the array 'h_event'. The first implication is recognized from the following constraint.

```
foreach (h_event[x]) {
    selector[x] == 0 -> h_event[x] == 0;
}
```

In this case, the variable mapping in the implication is as below.
Map: (lhs: INDEX, rhs: INDEX)
The implication type is recognized as below.
GENERAL(0→0)
The second implication is recognized from the following constraints.

```
foreach (h_event[i]) {
    (selector[x][0]) -> (h_event[x] == 4'h1);
    (selector[x][1]) -> (h_event[x] == 4'h4);
    (selector[x][2]) -> (h_event[x] == 4'h6);
    (selector[x][3]) -> (h_event[x] == 4'h8);
    (selector[x][4]) -> (h_event[x] == 4'ha);
    (selector[x][5]) -> (h_event[x] == 4'hc);
    (selector[x][6]) -> (h_event[x] == 4'he);
    (selector[x][7]) -> (h_event[x] == 4'h2);
    (selector[x][8]) -> (h_event[x] == 4'h5);
    (selector[x][9]) -> (h_event[x] == 4'h7);
    (selector[x][10]) -> (h_event[x] == 4'h9);
    (selector[x][11]) -> (h_event[x] == 4'hb);
    (selector[x][12]) -> (h_event[x] == 4'hd);
    (selector[x][13]) -> (h_event[x] == 4'hf);
    (selector[x][14]) -> (h_event[x] == 4'h3);
}
```

In this case, the variable mappings in the implication are recognized as below.
Map1: (lhs: INDEX, rhs: INDEX)
Map2: (lhs: BIT, rhs: NONE)
The implication type is ONEHOT with a mapping table from the constraint.

ONEHOT (mapping table)
Case 9) r1, r2, h_event→h_event (Imply Edges 430, 432 in FIG. 4C)

Since the problem type of the array 'h_event' is a conditional Unique0, the implication is represented using a Join operator whose type is Boolean AND (&&) that has three incoming JoinImply edges 431, 433, 435 from arrays 'r1', 'r2', and 'h_event' itself. The condition is true when this Boolean AND condition is true, which is when r1[i] is 0, and r2[i] is 0, and h_event [i] is not 0. Each JoinImply type in this case is either 'EQ 0' or 'NEQ 0'. This implication is recognized from the following constraint.

```
foreach (h_event[i]) {
    foreach (h_event[j]) {
        if (j > i) {
            (((h_event[i] != 4'h0) && (r1[i] == 2'h0)) && (r2[i] == 1'h0)) ->
                (h_event[j] != h_event[i]);
        }
    }
}
```

In this case, the variable mapping in the implication is recognized as below.
Map: (lhs: INDEX, rhs: INDEX)
Even though there are three lhs arrays, since their variable mapping is same, there is only one common variable mapping. In a case where any of the variable mappings is different from the others, there may be an array of variable mappings such as "lhs: {INDEX, BIT, INDEX}".

When there are equivalence relations between two array problems, meaning that all elements of one array are supposed to be same as elements of the other array, the array problems and their implications are merged to solve the merged array problem at once. Otherwise, it is very likely to have local conflict by solving one array problem after another. Instead, the system can solve the merge array problem in one of the two problems and copy the results to the other array.

Listing 7 below illustrates an example of equivalence relation.

Listing 7: An example illustrating equivalence relation

```
rand bit[31:0] X[37][2];
rand bit[31:0] Y[2][37];
bit[31:0] X_data[37] = '{8000000, 8000000, ... , 234375000, ... , 234375000};
bit[31:0] Y_data[2] = '{713750000, 713750000};
constraint cons_X  {
   foreach (X[i])
      X.sum( ) <= X_data[i];
}
constraint cons_Y  {
   foreach (Y[i])
      Y.sum( ) == Y_data[i];
}
constraint cons_eq
   foreach (X[i,j])
      X[i][j] == Y[j][i]; // transposed equivalence (i and j are swapped)
}
constraint cons_elem {
   foreach (Y[i,j])
      Y[i][j] >= 125000;
}
```

In two-dimensional arrays, the equivalence relations can be on the transposed variable mapping as shown in Listing 7. In this example, the rows and columns are transposed between the arrays X and Y. The array X has 2 rows and 37 columns, whereas the array Y has 37 rows and 2 columns.

Figure 5A:
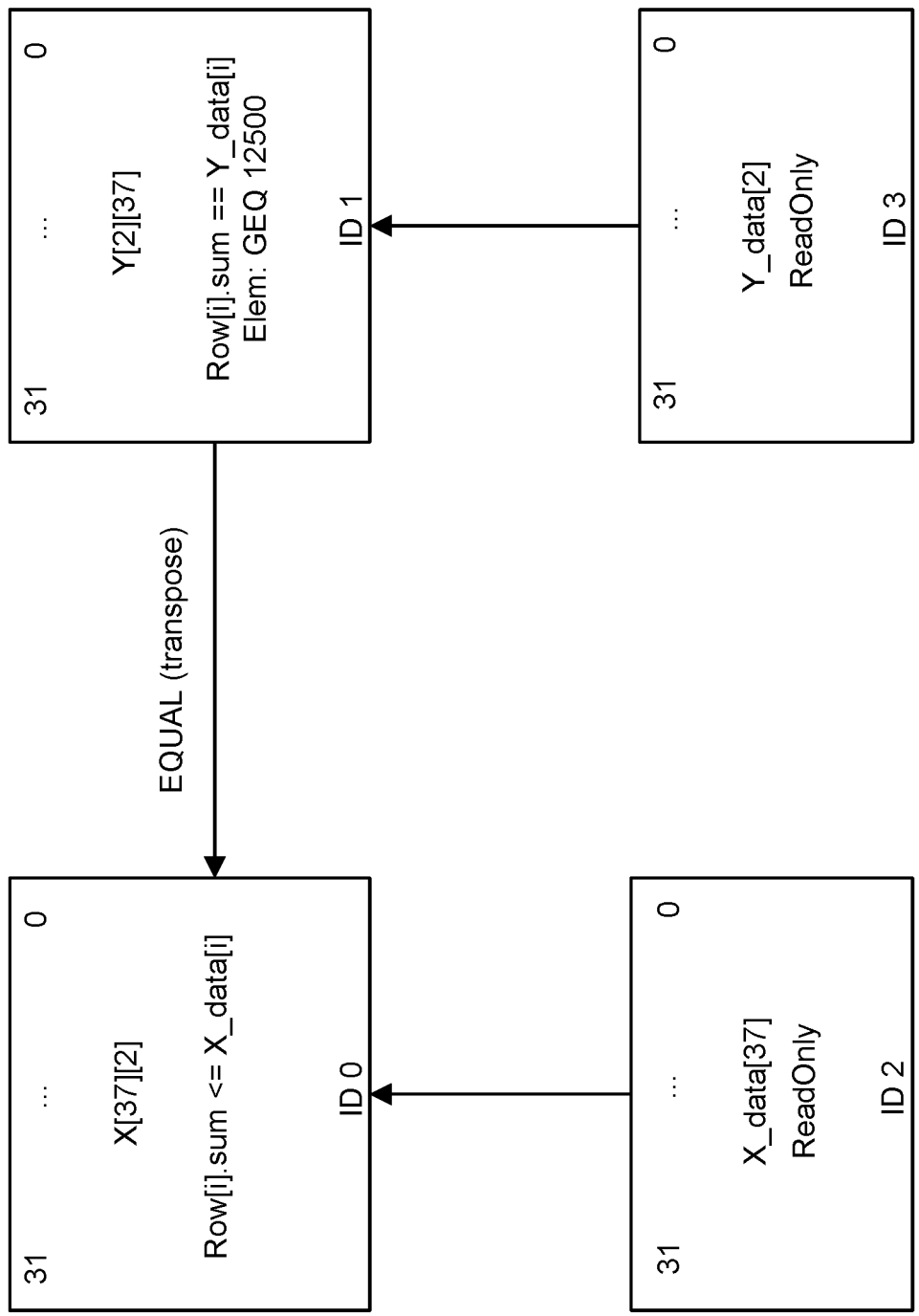
FIG. 5A illustrates an example array implication graph before merging according to embodiments of the disclosure.

FIG. 5A shows the initial array implication graph from the example in Listing 7. The problem type of the array X is a summation on the rows and the summation of i-th row and is supposed to be less than or equal to X_data[i]. Similarly, the problem type of the array Y is also a summation on the rows and the summation of i-th row and is supposed to be equal to Y_data[i]. The element constraint is only on the array Y, which is that each element is supposed to be greater than or equal to 12500. The implication between arrays X and Y is 'EQUAL (transpose)' which is equivalence relation with transposed manner.

Figure 5B:
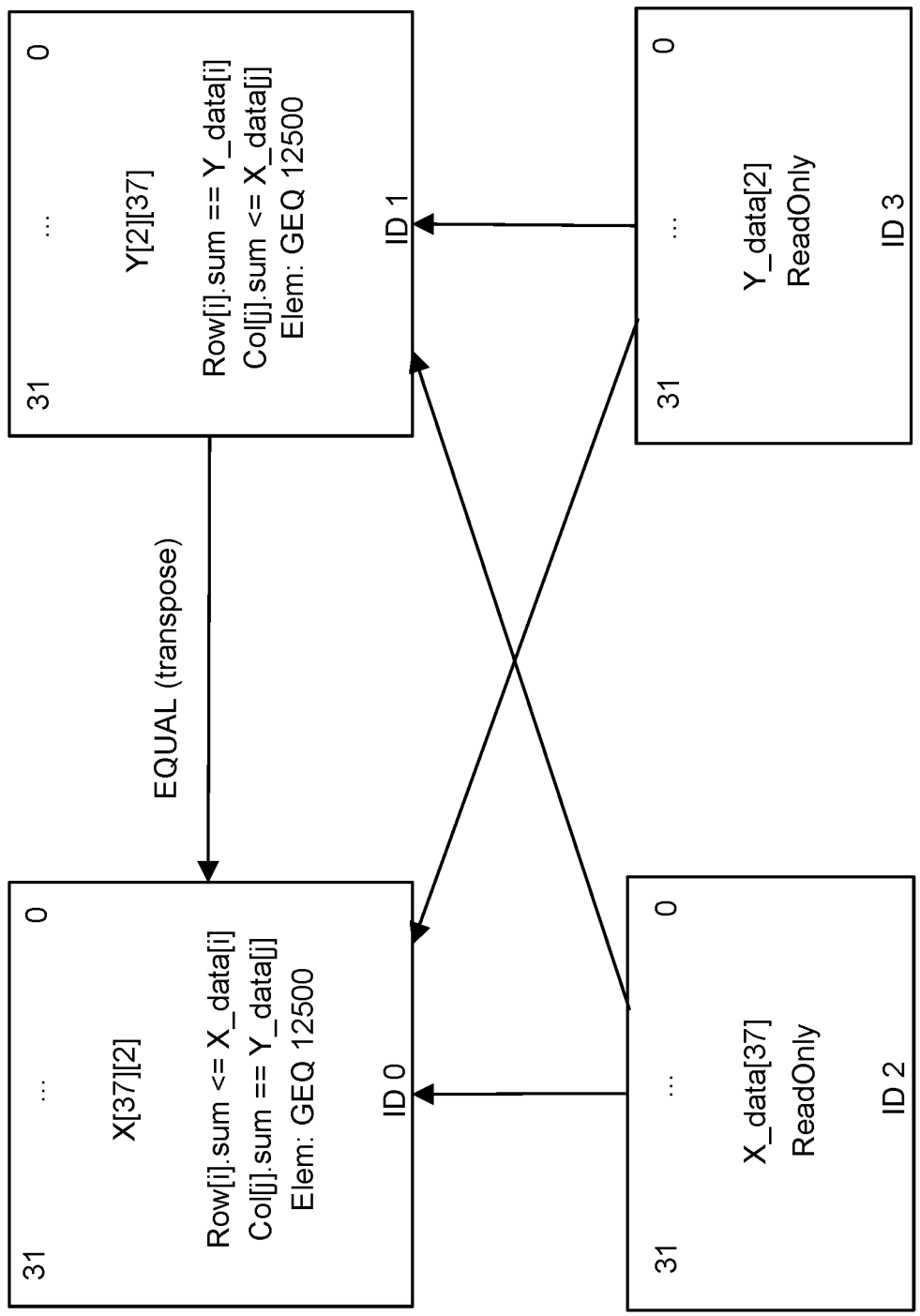
FIG. 5B illustrates the array implication graph of FIG. 5A after merging according to embodiments of the disclosure.

Once there is an equivalence relation on an Imply, the two problems of the Imply are merged and the array implication graph also is updated as desired. FIG. 5B shows the array implication graph after merging the equivalence relation in FIG. 5A.

Now, both the arrays X and Y have two Summations on both rows and columns. Also, the element constraint (GEQ 12500) is now on both problems of X and Y. Also, two additional Imply edges are created. One is from X_data to Y and the other is from Y_data to X. The rows in one array are the columns in the other array, and similarly the columns in one array are the rows in the other array. Thus, the system can solve either of X and Y, and copy the results of one to the other array.

Figure 6:
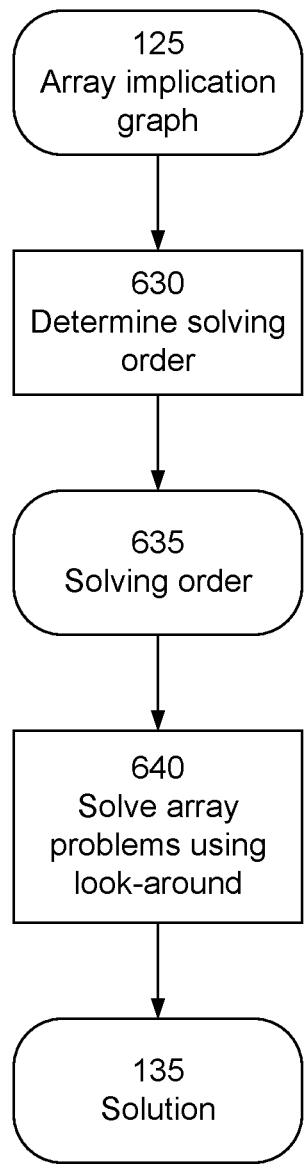
FIG. 6 is a flow diagram for solving array problems according to embodiments of the disclosure.

FIG. 6 shows an example implementation of step 130 in FIG. 1. The array implication graph 125 is constructed at the array-level, in that it captures how each array problem implies to other array problems. At 630, an order 635 for solving the individual array problems may be determined based on the array implication graph 125. For example, this may be done by applying data flow analysis to the array implication graph 125.

At 640, the array problems are solved according to the solving order 635. However, when an array problem is solved, a look-around technique is used to also consider array problems that are related according to the array implication graph. Look-back may be used to consider those array problems implying to the current problem, and look-ahead may be used to consider those array problems implied by the current problem. In this way, the current array problem is solved considering interactions with other arrays, in order to reduce local conflicts. If the overall solution process gets stuck, restart can be used.

Step 630 of FIG. 6 may be performed using data flow analysis as follows. First, groups of array problems are formed according to their implications. It is possible that an array problem is not connected to any other array problem by implication. In that case, the isolated array problem can be solved independently from the other array problems because there are no interactions.

Generalizing this concept, there may be situations where there are no implications between one group of problems and another group of problems. These two groups do not interact and can be solved independently.

Second, within a group of connected array problems, the solving order may be determined by tracing data flow from sources to sinks according to the directions of the implications. A source is an array problem that is not implied by other array problems, but implies to other array problems. In other words, a source is an array problem that does not have an incoming Imply edge, but has outgoing Imply edges. A sink is an array problem that does not imply to other array problems, but is implied by other array problems. For example, in FIG. 3, the source array problems are 'values' and 'count' (ID 0 and 1) and the sink array problem is 'valid' (ID 3).

Data can then be traced from the sources to the sinks according to the Imply edges. One approach is referred to as levelization. The sources are Level 0 and the sinks are Level N. Each traversal of an edge adds a level, so the level number for a node reflects the minimum number of Imply edges to be traversed from the nearest source to that node. In FIG. 3, the 'values' and 'count' (ID 0 and 1) nodes are Level 1, the 'appear' (ID 2) node is Level 1, and the 'valid' (ID 3) node is Level 2.

The levels then define the solving order 635. A solving order can be obtained from the lowest level (sources) to the highest level (sinks). When there are any tie cases in choosing the next array problem, any tie-breaker can be used such as random selection or with any heuristics. For the problem in FIG. 3, one possible solving order is obtained as (0, 1, 2, 3) in terms of the IDs of the array problems. For the problem in FIG. 4, one possible solving order is obtained as (0, 5, 6, 4, 1, 2, 3, 7) in terms of their IDs.

Once a solving order is determined for the array problems, the system can solve one array problem at a time in the solving order, for example possibly using specialized solvers. However, when an array problem is being solved, the interactions (implications) with array problems that are adjacent in the array implication graph are also considered. This will reduce the risk of potential local conflicts. This may be referred to as solving an array problem with look-around. The term look-around includes both look-back and look-ahead to those interacting array problems via the Imply edges on the array implication graph.

Figure 7:
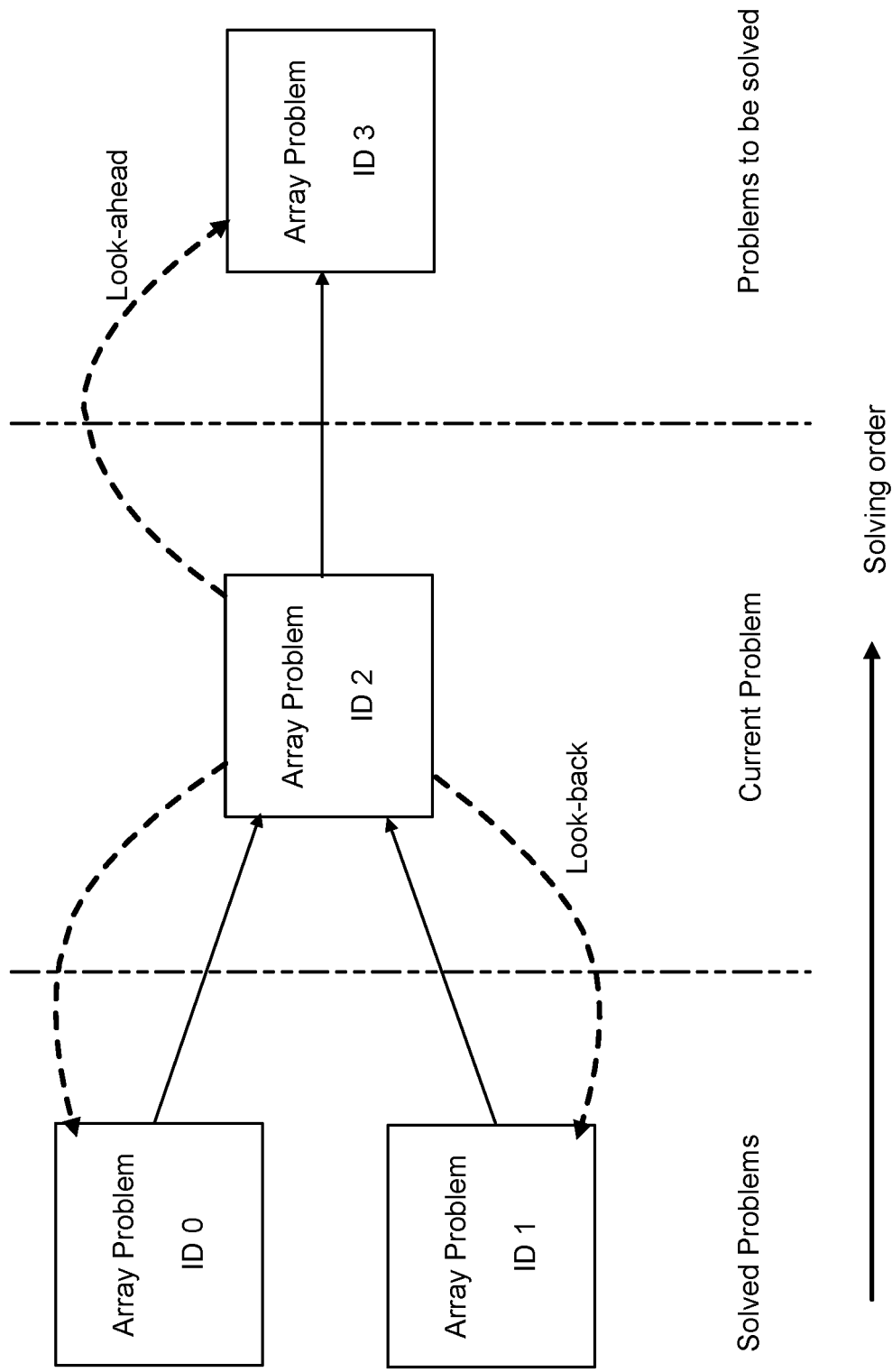
FIG. 7 illustrates solving array problems with look-around according to embodiments of the disclosure.

FIG. 7 illustrates solving array problems with look-around. In FIG. 7, the solving order for the four array problems are ID 0→ID 1→ID 2→ID 3. In FIG. 7, ID 0 and ID 1 were already solved and the current problem to solve is ID 2. In this case, the system looks around from the current problem ID 2 for those array problems that have a direct implication with the current problem, and generates temporary constraints on the fly from the implications. The temporary constraints are applied only in solving the current problem. Applying these constraints reduces the risk that the current problem will arrive at a solution that conflicts with the other array problems. Look-back is performed on those array problems (both ID 0 and ID 1 in this case) that were already solved and implying to the current problem directly. Look-ahead is performed on those array problems (ID 3 in this case) that are not solved yet and implied by the current problem directly.

A look-back is to look at those solved values on the already solved array problems that are implying to the current array problem. For example, when an Imply has a conditional implication from another array problem that was already solved, the conditional implication becomes a fixed unconditional implication. This look-back produces tighter constraints that reduce the chance of local conflicts.

As an example of look-back from Listing 6 above, when the system solves a row summation of config1[3], if r1[5] was assigned to 2, the valid value of config1[3][5] is bound to the range of [0:16] from the conditional implication. Thus, each column value config1[3][j] is bound to one of the four conditional ranges. Similarly, if selector[5][3] is assigned to 1, the valid value range of config1[3][5] is further bounded to the range of [1:16] from the conditional implication from 'selector' to 'config1' as shown in in Case 1) above. In this way, the look-back guarantees to satisfy those implications from the already-solved array problems.

A look-ahead is to look at the unsolved array problems implied by the current array problem, in order to avoid any potential local conflicts as much as possible when solving those implied array problems later from the solved values on the current array problem.

As an example of look-ahead from FIG. 4, when the system solves the array 'selector', suppose that the number of bit value 1 on all 64 selector[i][1] is 3. Then, there is no solution satisfying the row summation of config1[1], which is supposed to be equal to value1[1] (which is 0). This is because 1) each element value can be only up to 64 even though the array element is declared as 8-bit variable whose max value is 255, and 2) there is no way to make the summation zero with only 3 non-zero values. To make the summation zero, either there should be all zeroes, or there should be at least 4 non-zero values since 64+64+64+64=256 which is 0 in 8-bit variable by the overflow semantics in a hardware description or hardware verification language (e.g., SystemVerilog). Thus, when the system solves the array 'selector', the system can add an extra implication from the array 'config1' such that the sum of all selector[i][1] is 0 or at least 4 or higher since value1[1] is 0. Similarly, since value2[0] is 2, the sum of all selector[i][7] shouldn't be 3. This is also because a sum of 2 is not possible with 3 non-zero values. In this way, look-ahead reduces potential local conflicts that could happen when solving those unsolved problems later subject to the solved values from the current array problem.

When no solution can be found for the current array problem due to a local conflict caused by one or more of the already solved array problems, various approaches may be taken.

In one approach, the solved value of the already-solved array problem may be modified. In certain cases, the system can find a solution by modifying the solved value of an element of an already-solved array problem implying to the current array problem on the fly, if the modified value still satisfies not only the implying array problem itself, but also all implications. For example, in Listing 6, suppose that one row summation in 'config1' should be 2 with 5 non-zero elements, and the implied valid ranges of the 5 elements are [1:4], [1:16], [1:64], [1:64], [1:64]. In this case, the system cannot find a solution for the summation since the maximum value of the summation is only 4+16+64+64+64=212. However, if the system can change the valid ranges of either the first or second element to be [1:64] by changing the conditional implication from the array 'r1', which can be done by modifying the value of the corresponding element of the array 'r1' to 3, then the system can find a solution for the row summation.

Another approach is to re-solve the already-solved array problems which are implying to the current array problem. Once an implying array problem is re-solved, all next array problems in the solving order may also be re-solved. However, this re-solving approach can be applied subject to an upper limit on the number of times, so as not to get into an infinite loop.

Figure 8A:
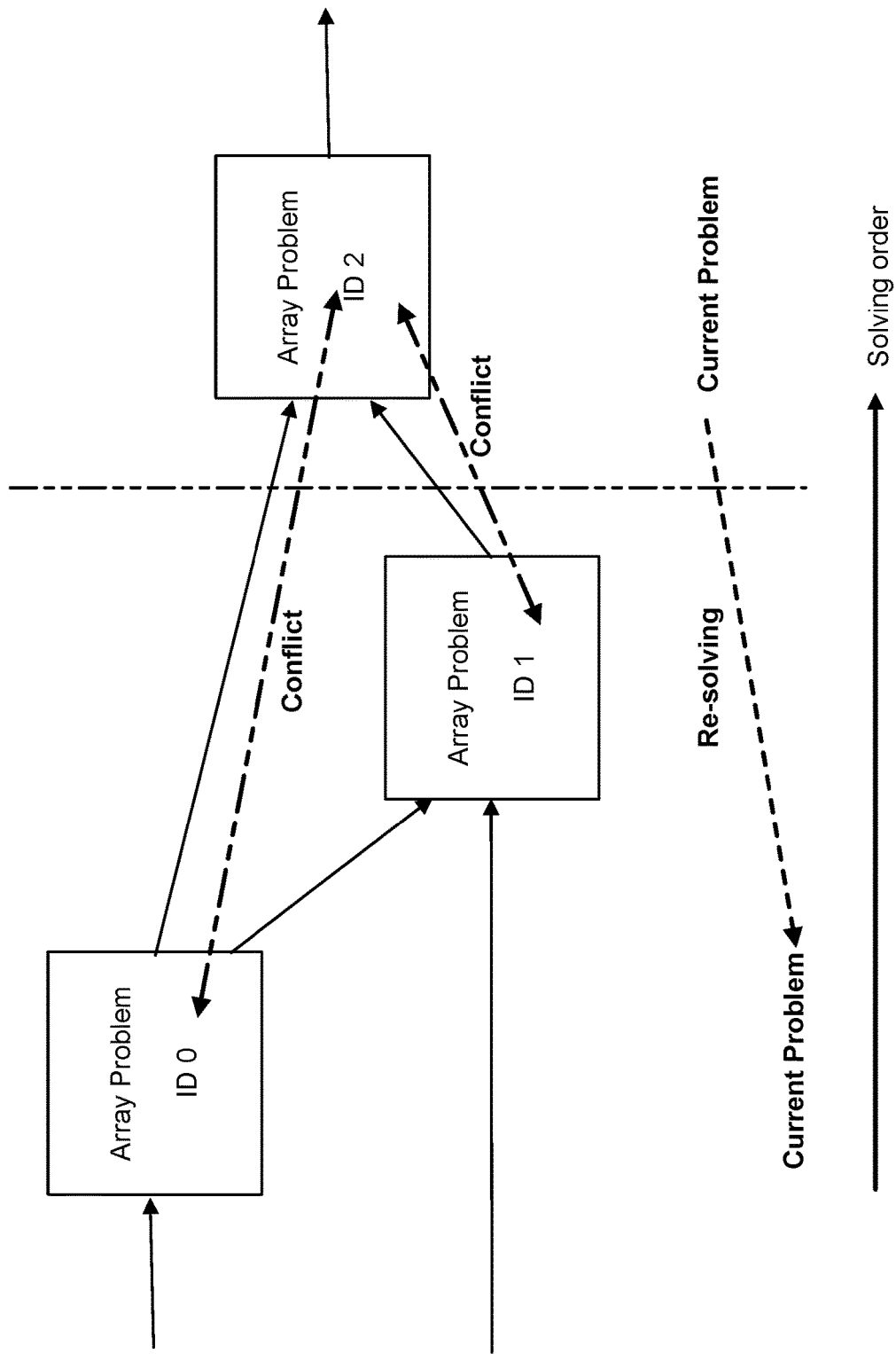
FIG. 8A illustrates addressing local conflicts by re-solving an already solved problem according to embodiments of the disclosure.

FIG. 8A shows an example of re-solving two already solved array problems when the current problem cannot be solved due to local conflicts caused by the solutions of the two array problems. In this case, the solving order of the three array problems is ID 0→ID 1→ID2. Suppose that both array problems with ID 0 and ID 1 were already solved, and the current problem with ID 2 cannot be solved due to the local conflicts from the problems with ID 0 and ID 1. Since the array problem with ID 0 appears first before the array problem with ID 1 in the solving order, the current problem is moved to the array problem with ID 0 which is going to be re-solved.

In one aspect, suppose that now a local conflict happens only between the two array problems with ID 0 and ID 2. Thus, the system moves the current problem from ID 2 to ID 0. In this case, the solution of the array problem with ID 1 may be discarded. However, as an alternative in this re-solving approach, the solution of the array problem with ID 1 may be still kept and discarded only when it is actually re-solved. This is because there could be no conflict on the implications between the two array problems with ID 0 and ID 1 even after the array problem with ID 0 is re-solved. Then, the current problem can be moved from ID 0 to ID 2, which is referred to as forward-jumping.

Figure 8B:
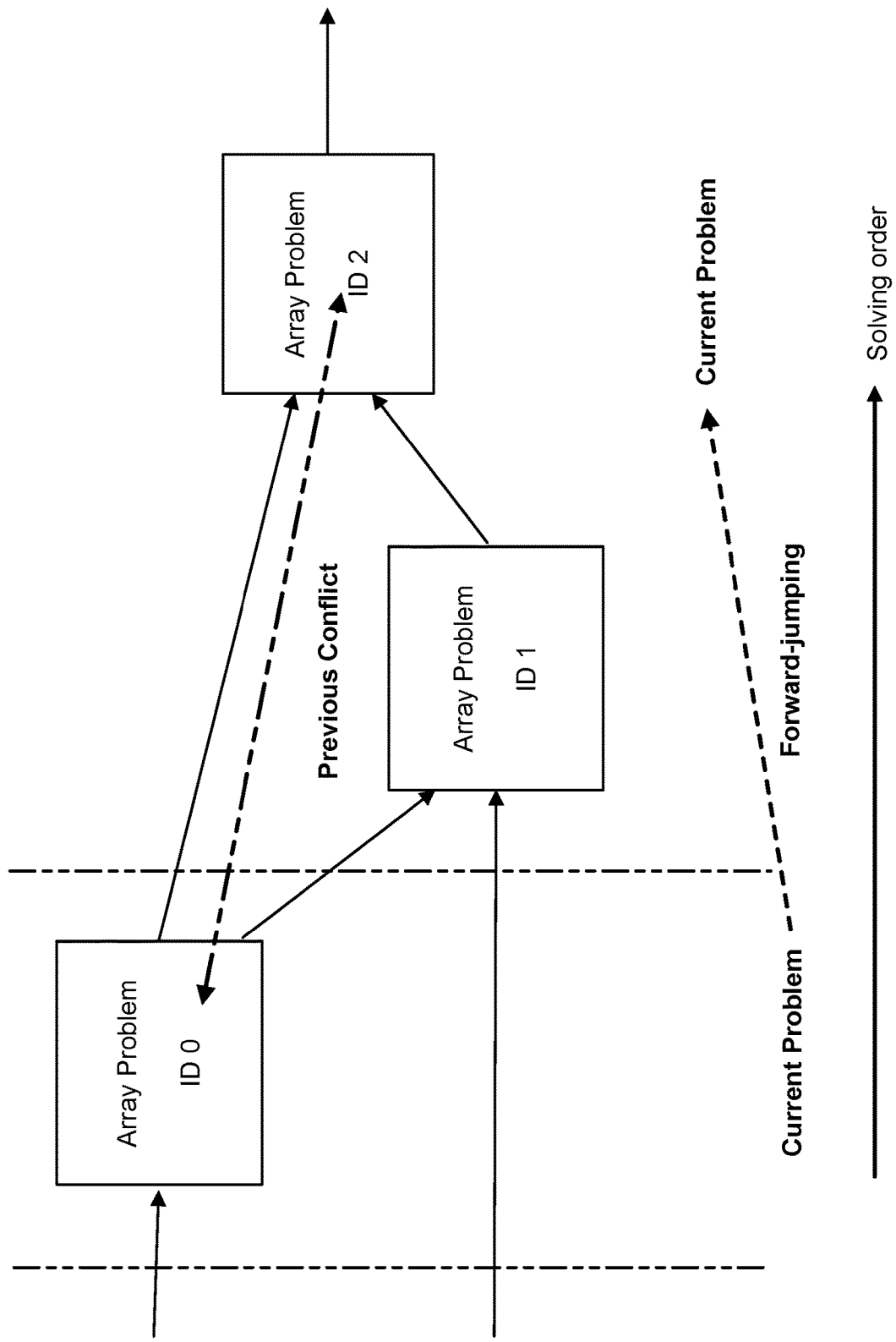
FIG. 8B illustrates forward-jumping after re-solving according to embodiments of the disclosure.

FIG. 8B shows how the current problem is moved with forward-jumping after re-solving an array problem. After re-solving the array problem with ID 0, if there is no conflict on the implications between the two array problems with ID 0 and ID 1, the previous solution on the array problem with ID 1 is still valid. Then, the current problem can be moved forward to the array problem with ID 2, non-chronologically in the solving order.

Another remedy to local conflicts is to restart solving the whole problem. This restarting approach also can be applied up to a threshold number of times so as not to get into an infinite loop.

The system disclosed is able to solve the problem of generating test stimuli for the functional verification of logic designs, with multi-array problems that were too hard previously for the existing technologies with SAT, ATPG, and SMT. Table 2 shows some experimental results using the techniques disclosed.

TABLE 1

Experimental results

| Testcase | Stats | | Solver 1 | Solver 2 | System Disclosed Randomizations (seconds) | | |
|---|---|---|---|---|---|---|---|
| | Arrays | Vars | 1 | 1 | 1 | 100 | 1000 |
| P1 | 4 | 48 | Timeout | Timeout | 1.17 | 1.84 | 2.66 |
| P2 | 10 | 1273 | Timeout | Timeout | 1.95 | 4.91 | 29.45 |
| P3 | 4 | 189 | Timeout | Timeout | 0.58 | 0.84 | 3.20 |

All problems in the table were too hard for alternative constraint solvers 1 and 2 (timeout in 1000 seconds, memory-out at 4G). However, these hard problems were solved quickly with the system described herein. In Table 2, the first column shows the test case label. The next two columns have the statistics in terms of the number of arrays and the number of variables for each test case. The remaining columns compare the performance of this system (System Disclosed) with alternative Solvers 1 and 2. The last three columns show the total CPU times with this system with different numbers of randomizations (e.g., different numbers of generated test stimuli), which shows this technique is consistently fast over many randomizations. This shows that the system disclosed provides a technological improvement in constraint solving.

Figure 9:
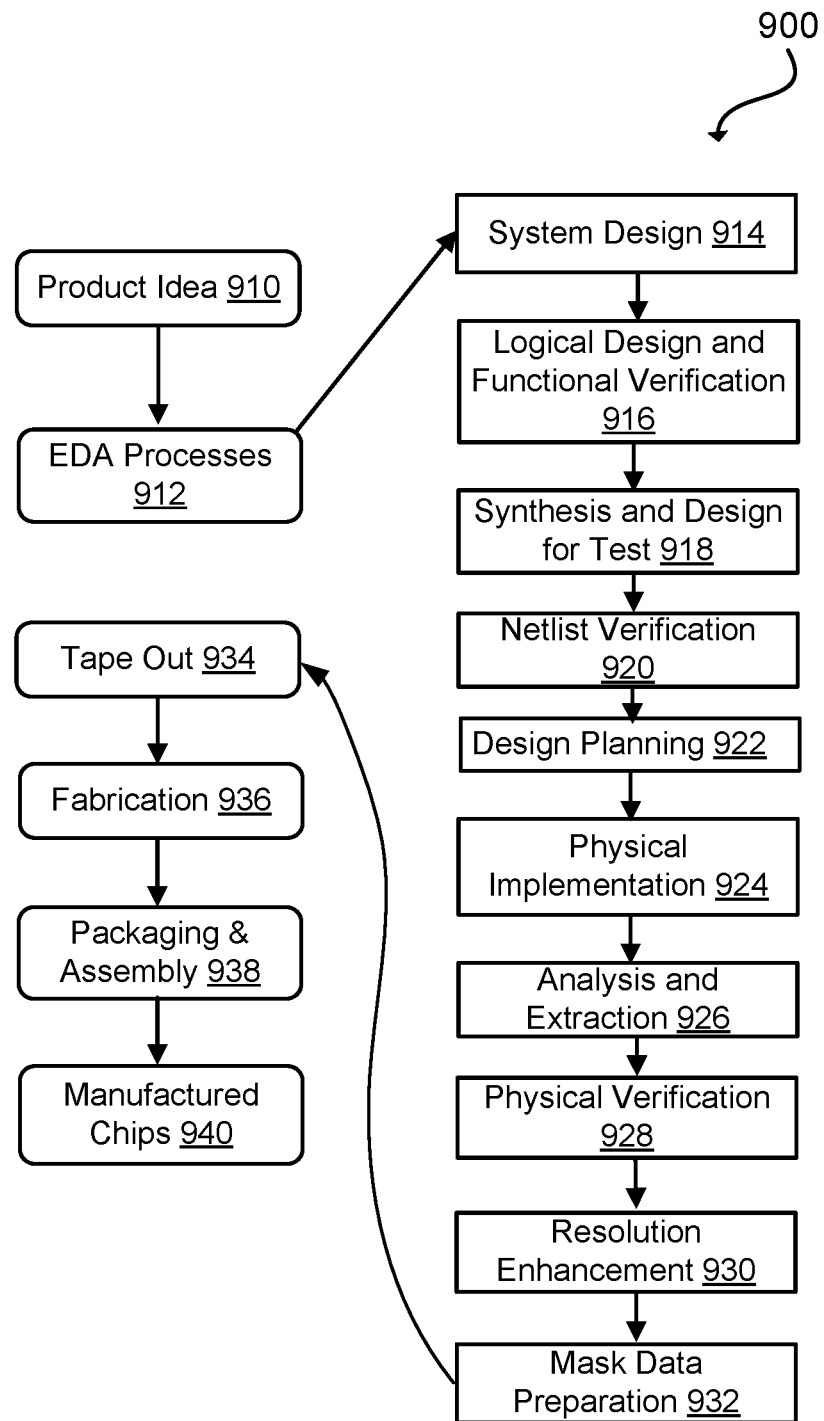
FIG. 9 depicts a flowchart of various processes used during the design and manufacture of an integrated circuit in accordance with some embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is more concrete description adds more useful detail into the design description, for example, more details for the modules that include the description. The lower levels of representation that are more concrete descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 9. The processes described by be enabled by EDA products (or tools).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system may be used to store the programs and data structures that are used by some or all of the EDA products described herein, and products used for development of cells for the library and for physical and logical design that use the library.

Figure 10:
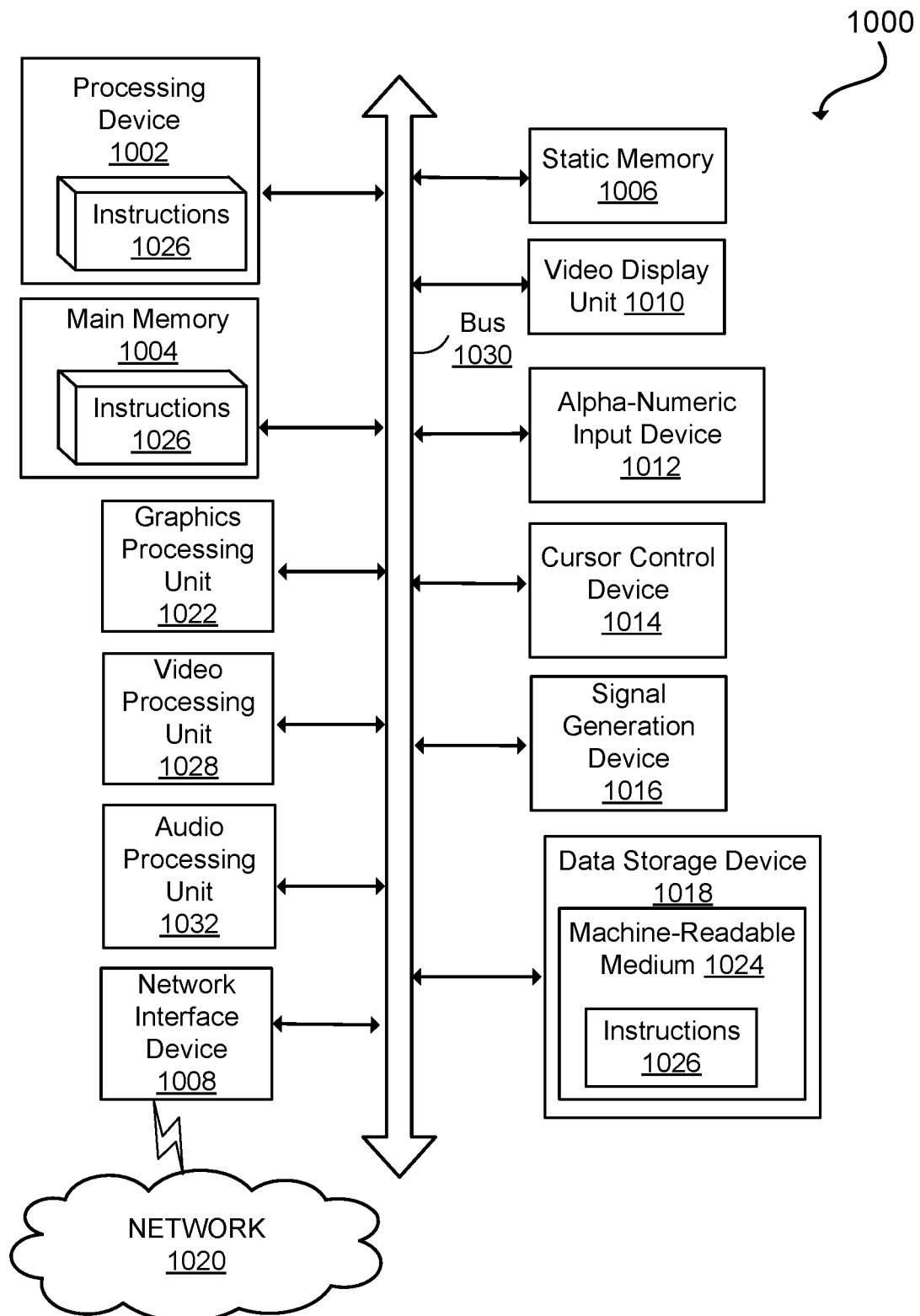
FIG. 10 depicts a diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
accessing a specification describing a logic design undergoing functional verification, wherein the functional verification includes generating a test stimulus comprising test values for a plurality of variables representing signals in the logic design, and generating the test stimulus comprises a first problem of solving for the test values of the variables subject to constraints on the test values;

generating, by a processing device, an array implication graph from the specification, wherein:

the array implication graph represents the first problem as a set of two or more single-array constraint problems;

each single-array constraint problem solves for the test values of a single array of the variables subject to the constraints within that single array; and the array implication graph represents dependencies between different single-array constraint problems;

solving the first problem based on the dependencies represented in the array implication graph; and generating the test stimulus based on the solved first problem, and applying the test stimulus to the logic design for the functional verification of the logic design.

2. The method of claim 1 wherein generating the array implication graph from the specification comprises:

recognizing, based on the specification, a type of single-array constraint problem for at least some of single-array constraint problems in the set; and generating the array implication graph based on the recognized types.

3. The method of claim 2 wherein recognizing the type of single-array constraint problem uses rule-based pattern recognition.

4. The method of claim 1 wherein generating the array implication graph from the specification comprises:

recognizing, based on the specification, the dependencies between different single-array constraint problems; and generating the array implication graph based on the recognized dependencies.

5. The method of claim 4 wherein recognizing dependencies between different single-array constraint problems uses rule-based pattern recognition.

6. The method of claim 1 wherein generating the array implication graph from the specification comprises:

generating a word-level syntax tree representation of the first problem from the specification;

recognizing, based on the syntax tree representation, a type of single-array constraint problem for at least some of the single-array constraint problems in the set;

recognizing, based on the syntax tree representation, the dependencies between different single-array constraint problems; and generating the array implication graph based on the recognized types and the recognized dependencies.

7. The method of claim 1 wherein solving the first problem based on the dependencies represented in the array implication graph comprises:

individually solving the single-array constraint problems according to the array implication graph.

8. The method of claim 7 wherein individually solving the single-array constraint problems according to the array implication graph comprises:

determining, from the dependencies represented in the array implication graph, an order for solving the single-array constraint problems; and individually solving the single-array constraint problems in the determined order.

9. The method of claim 7 wherein individually solving the single-array constraint problems according to the array implication graph comprises:

when individually solving any particular single-array constraint problem, further constraining the solution based on a previous solution for another single-array constraint problem adjacent to the particular single-array constraint problem in the array implication graph, wherein the further constraint is determined based on the previous solution for the other single-array constraint problem and on the dependency in the array implication graph between the two single-array constraint problems.

10. The method of claim 9 wherein the other single-array constraint problem implies to the particular single-array constraint problem.

11. The method of claim 9 wherein the particular single-array constraint problem implies to the other single-array constraint problem.

12. A system comprising:

a memory storing instructions and an array implication graph for a multi-array constraint problem relating to a logic design; wherein the multi-array constraint problem comprises a set of two or more single-array constraint problems, each single-array constraint problem is a problem to solve for values of variables in a single array subject to constraints on those values, and at least two of the single-array constraint problems interact with each other; and the array implication graph comprises nodes and edges, wherein each node represents one of the single-array constraint problems, and an Imply edge between two nodes represents a dependency between the single-array constraint problems represented by the two nodes; and a processing device, coupled with the memory and to execute the instructions, the instructions when executed cause the processing device to:

individually solve the single-array constraint problems according to the array implication graph generating the test stimulus based on the solved first problem; and applying the test stimulus to the logic design for the functional verification of the logic design.

13. The system of claim 12 wherein the array implication graph further comprises Join operators and JoinImply edges that represent a dependency involving at least three single-array constraint problems.

14. The system of claim 12 wherein at least one of the dependencies is a conditional implication.

15. The system of claim 12 wherein at least one of the edges is unidirectional, and at least one of the edges is bidirectional.

16. The system of claim 12 wherein the array implication graph contains sufficient information to define each of the single-array constraint problems.

17. A non-transitory computer readable medium comprising stored instructions, which when executed by a processor device, cause the processor device to:

generate an array implication graph for a multi-array constraint problem, relating to a logic design; wherein the multi-array constraint problem comprises a set of two or more single-array constraint problems, each single-array constraint problem is a problem to solve for values of variables in a single array subject to constraints on those values, at least two of the single-array constraint problems interact with each other, and the array implication graph represents dependencies between single-array constraint problems within the multi-array constraint problem; and solve the individual single-array constraint problems in accordance with the array implication graph generating the test stimulus based on the solved first problem; and applying the test stimulus to the logic design for the functional verification of the logic design.

18. The non-transitory computer readable medium of claim 17 wherein the multi-array constraint problem solves for test values of variables representing signals in a logic design undergoing logic simulation, subject to constraints on the test values.

19. The non-transitory computer readable medium of claim 18 wherein the array implication graph is generated from a hardware description language (HDL) specification for the logic design.

20. The non-transitory computer readable medium of claim 17 wherein the single-array constraint problems comprise one or more of: N-Queens problems, summation problems on multi-dimensional arrays on rows and/or columns, cardinality problems, difference logic problems, counting number of occurrences of a value in an array (e.g., count-ones), ordering problems, and uniqueness problems.

* * * * *